United States Patent
Urata et al.

(10) Patent No.: US 11,007,950 B2
(45) Date of Patent: May 18, 2021

(54) MOUNTING BASE, AND VEHICLE GLASS WITH MOUNTING BASE

(71) Applicant: AGC Inc., Tokyo (JP)

(72) Inventors: Ryoichi Urata, Tokyo (JP); Masayuki Sase, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/455,345

(22) Filed: Jun. 27, 2019

(65) Prior Publication Data

US 2020/0010021 A1 Jan. 9, 2020

(30) Foreign Application Priority Data

Jul. 9, 2018 (JP) .............................. JP2018-130132

(51) Int. Cl.
  *B60R 11/00* (2006.01)
  *B60R 11/04* (2006.01)

(52) U.S. Cl.
  CPC .............. *B60R 11/00* (2013.01); *B60R 11/04* (2013.01); *B60R 2011/0026* (2013.01); *B60R 2011/0049* (2013.01)

(58) Field of Classification Search
  CPC . B60R 11/00; B60R 11/04; B60R 2011/0049; B60R 2011/0026; B60R 1/04; B60R 2011/0077; B60R 2011/0075
  USPC .................................................. 248/466–498
  See application file for complete search history.

(56) References Cited

U.S. PATENT DOCUMENTS

| | | | | |
|---|---|---|---|---|
| 5,377,948 A | * | 1/1995 | Suman | B60R 1/04 248/549 |
| 5,820,097 A | * | 10/1998 | Spooner | B60R 1/04 248/549 |
| 6,299,319 B1 | * | 10/2001 | Mertens | B60R 1/04 359/871 |
| 7,510,287 B2 | * | 3/2009 | Hook | B60R 1/04 248/481 |
| 10,557,729 B2 | * | 2/2020 | Higashimachi | B60R 11/0235 |
| 2009/0295181 A1 | * | 12/2009 | Lawlor | B60R 1/12 296/1.11 |
| 2010/0133410 A1 | * | 6/2010 | Gruener | B60R 11/02 248/475.1 |
| 2016/0229346 A1 | * | 8/2016 | Oh | H04N 5/2253 |
| 2017/0012150 A1 | * | 1/2017 | Baba | H01L 23/58 |
| 2017/0184201 A1 | * | 6/2017 | Gorol | F16J 15/3228 |

FOREIGN PATENT DOCUMENTS

JP 2017-071334 A 4/2017

* cited by examiner

*Primary Examiner* — Muhammad Ijaz
(74) *Attorney, Agent, or Firm* — Foley & Lardner LLP (57) ABSTRACT

A mounting base for mounting in-vehicle components on an interior side of a vehicle glass, comprising a mirror base for mounting a rear-view mirror, and a component base for mounting an in-vehicle component other than the rear-view mirror is provided. The mirror base and the component base are each at least partially exposed on a mounting surface side of the vehicle glass. The mirror base is fixed to the component base, and formed of a material having a modulus of longitudinal elasticity greater than a modulus of longitudinal elasticity of the component base.

13 Claims, 9 Drawing Sheets

MOUNTING BASE, AND VEHICLE GLASS WITH MOUNTING BASE

CROSS-REFERENCE TO RELATED APPLICATION

The present application is based on and claims benefit of priority under 35 U.S.C. § 119 of Japanese Patent Application No. 2018-130132, filed Jul. 9, 2018. The contents of the application are incorporated herein by reference in their entirety.

BACKGROUND OF THE INVENTION

1. Field of the Invention

The present invention relates to a mounting base, and a vehicle glass with a mounting base.

2. Description of the Related Art

In a vehicle such as an automobile, an in-vehicle component such as an in-vehicle camera, an in-vehicle sensor or the like may be mounted on a surface such as a vehicle interior side surface of the vehicle glass. The in-vehicle component may often be mounted in a position adjacent to a rear-view mirror, in light of securing the vision of an occupant, and ensuring satisfaction of legal requirements. For example, Japanese Laid-open Patent Publication No. 2017-71334 discloses an accessory unit 3 used for mounting a vehicle accessory (an in-vehicle component) such as a camera, a sensor or the like, adjacent to a mirror unit 2 including a rear-view mirror 21.

According to the disclosure in Japanese Laid-open Patent Publication No. 2017-71334, the accessory unit 3 includes a bracket 40, which is able to be attached on a windshield glass 13 on the one side and is configured to retain an in-vehicle camera 50 on the other side. The bracket 40 is recessed to have a recess in which a supporting column 23 of a mirror unit 2 may be disposed and is adhesively bonded to the windshield glass 13.

In such a configuration, however, the bracket (mounting base) 40 of the accessory unit 3 and a supporting member 23 of the mirror unit 2 need to be each positioned on the surface of the windshield glass. Therefore, there could be a difficulty in closely and accurately aligning the bracket 40 of the accessory unit 3 and the mirror unit 2, and a sufficient accuracy in relative positioning of the rear-view mirror and the accessory unit 3 may not be achieved. As a result, the accessory unit 3 could hinder the function of the mirror unit 2, and vice versa.

SUMMARY OF THE INVENTION

The present invention is made in light of the above problems. It is a general object of at least one embodiment of the present invention to provide a mounting base for mounting in-vehicle components on a mounting surface inside of a vehicle, which enables to improve accuracy in relatively positioning the in-vehicle components.

According to an embodiment, a mounting base for mounting in-vehicle components on an interior side of a vehicle glass is provided, the mounting base comprising: a mirror base for mounting a rear-view mirror; and a component base for mounting an in-vehicle component other than the rear-view mirror, wherein the mirror base and the component base are each at least partially exposed on a mounting surface side of the vehicle glass, and wherein the mirror base is fixed to the component base, and formed of a material having a modulus of longitudinal elasticity greater than a modulus of longitudinal elasticity of the component base.

According to the embodiment, a mounting base for mounting in-vehicle components on a mounting surface inside of the vehicle, which enables to improve accuracy in relatively positioning the in-vehicle components.

BRIEF DESCRIPTION OF THE DRAWINGS

Other objects and further features of embodiments will become apparent from the following detailed description when read in conjunction with the accompanying drawings, in which.

DETAILED DESCRIPTION OF THE EMBODIMENTS

Embodiments of the present invention will now be described in detail. It is to be noted that, in the explanation of the drawings, the same or corresponding components are given the same or corresponding reference numerals, and explanations are not repeated. It is also to be noted that the invention is not limited to the embodiments described below.

Figure 1:
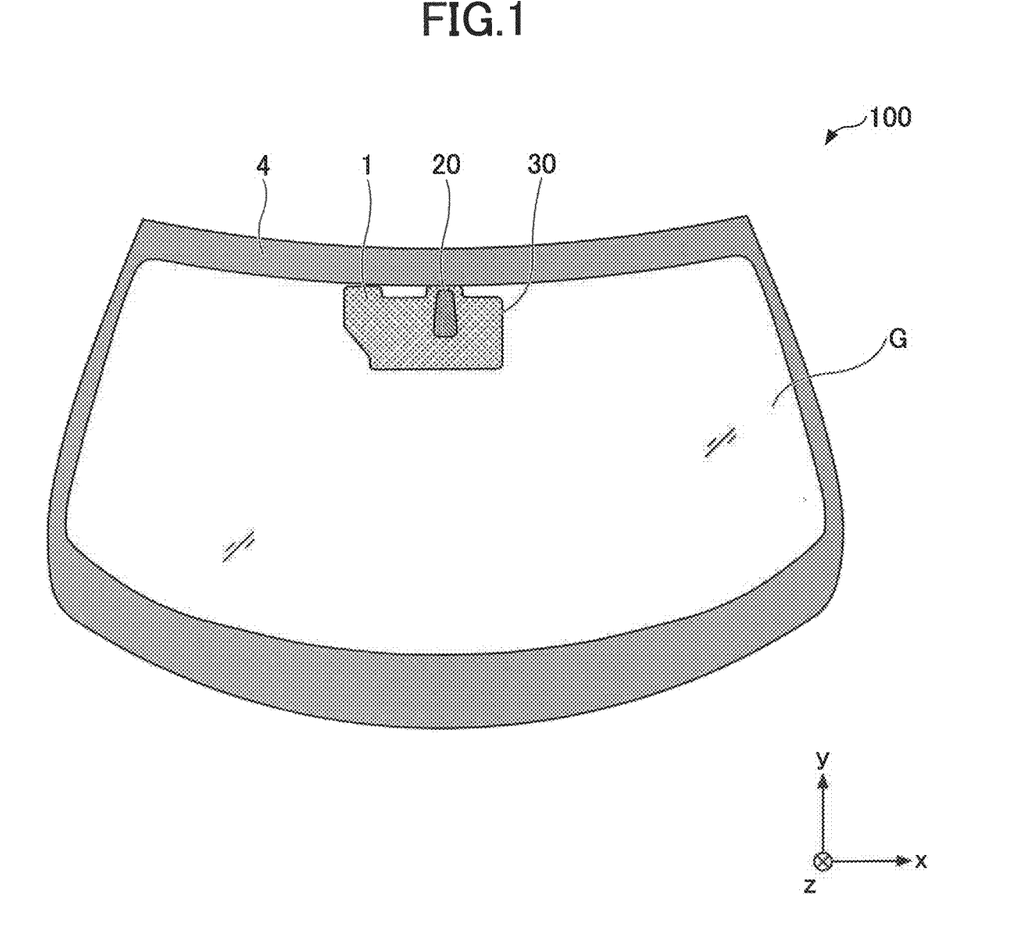
FIG. 1 is a schematic view of a configuration in which a mounting base according to an embodiment of the present invention is mounted on a mounting surface.

FIG. 1 illustrates a mounting base 1 according to an embodiment of the present invention, attached to amounting surface inside of the vehicle. In the example illustrated in FIG. 1, the mounting surface is a surface of a vehicle glass G, or a glass pate used in a vehicle, more specifically, a surface of a vehicle interior side of a windshield glass. FIG. 1 is a view of the glass G seen from the inside of the vehicle, in which some details of the mounting base 1 are not illustrated for the convenience of understanding.

In the drawings, an x-axis direction (a left-right direction) is a di with respect to the mounting base 1 being mounted on a mounting surface (glass G) inside of a vehicle, which is along a width of a vehicle, and the right direction in view from the inside of the vehicle is indicated as a +x direction. A y-axis direction is a direction with respect to the mounting base 1 orthogonal to the x-axis direction, along the surface of the mounting base 1, and a direction toward the upper end of the mounting surface (glass G) is indicated as a +y direction. A z-axis direction (a lower-upper direction) is a direction with respect to the mounting base 1 orthogonal to both of the x-axis direction and the y-axis direction, and a direction toward the mounting surface (glass G) is indicated as a +z direction. Further, the surface on the +z direction side (the surface on the side facing the mounting surface) of the mounting base 1 is referred to an upper surface, while the surface facing the −z direction side (the surface on the inside of the vehicle) is referred to as a lower surface.

In the present specification, a "mounting base" (also referred to as a "bracket") means a member to be a base (or a foundation) for mounting an in-vehicle component or in-vehicle components on a surface of a glass. The "mounting base" is a member that is disposed between the in-vehicle component(s) and the glass. The "mounting base" simplifies the process for mounting the in-vehicle component(s) to the mounting surface. The "mounting base" also enables the mounted in-vehicle component (s) to be held and fixed onto the mounting surface.

Further in the present specification, the term "in-vehicle component" means a device, a tool, or a member that is installed in a vehicle. Such an in-vehicle component may be one or more selected from an in-vehicle camera; in-vehicle sensors, such as a rain drop sensor (rain sensor), a defrost sensor, a temperature sensor, a humidity sensor, and a millimeter wave sensor; an antenna for an electronic toll collection system (ETCS), a radio, a terrestrial digital television, or the like; communication devices, such as a mutual communication type radio wave module, and a radio wave radio wave reception amplifier; and the like. In the present specification, the in-vehicle component also includes a rear-view mirror (interior mirror).

As illustrated in FIG. 1, the mounting base 1 is to be attached to the surface of the glass G. On the mounting base 1, a plurality of the in-vehicle components can be mounted from the vehicle interior side. For protection purpose, the in-vehicle components may be covered with an appropriate cover or the like, as necessary.

On the periphery of the glass G, a shield layer 4 may be disposed for protecting a sealant or the like with which the glass G can be adhesively retained to a vehicle body. The shield layer 4 may be formed by, for example, applying a color ceramic paste including a fusible glass frit and a black pigment, followed by baking. The shield layer 4 may be disposed on the surface on the vehicle interior side of the glass G. In the illustrated embodiment, the mounting base 1 is adhesively bonded directly to the surface of the glass G, or to the glass material. However, the mounting base 1 may be adhesively bonded to the shield layer 4, which is disposed on the surface on the vehicle interior side. As described below, the glass G may be a laminated glass wherein an interior glass plate on the vehicle interior side and an exterior glass plate on the vehicle exterior side are adhesively bonded via an intermediate film. In a case of the laminated glass, the shield layer 4 may also be on the interior surface of the interior glass plate, and/or on the interior surface of the exterior glass plate. The mounting base 1 is preferably entirely or partially shielded by the shield layer 4 in a view from the outside of the vehicle (from the vehicle exterior side). This shielding by the shield layer 4 enables to avoid a diminished exterior appearance in the vehicle, and also to protect an adhesive (described below) used for bonding the mounting base 1 to the glass G.

Next, the configuration of the mounting base 1 will be described in detail.

Figure 2:
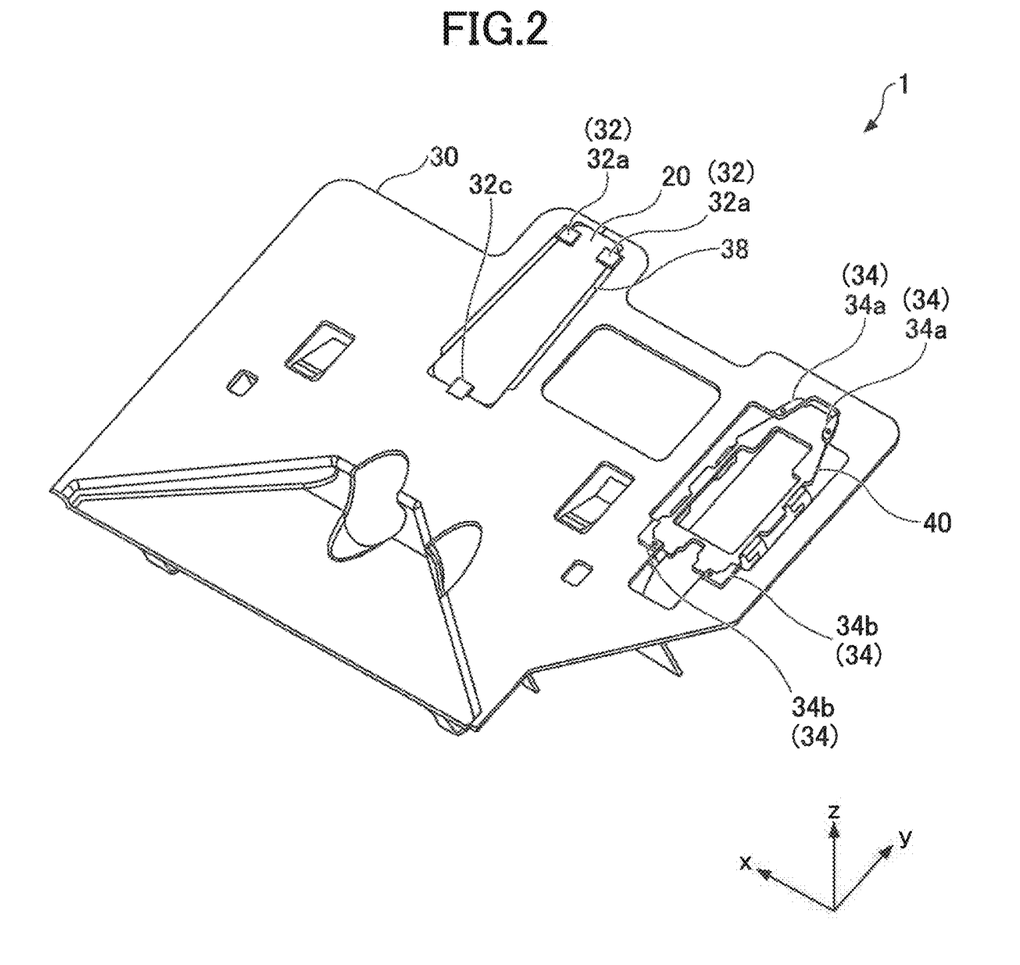
FIG. 2 is a perspective view of the mounting base according to a first embodiment.
Figure 3:
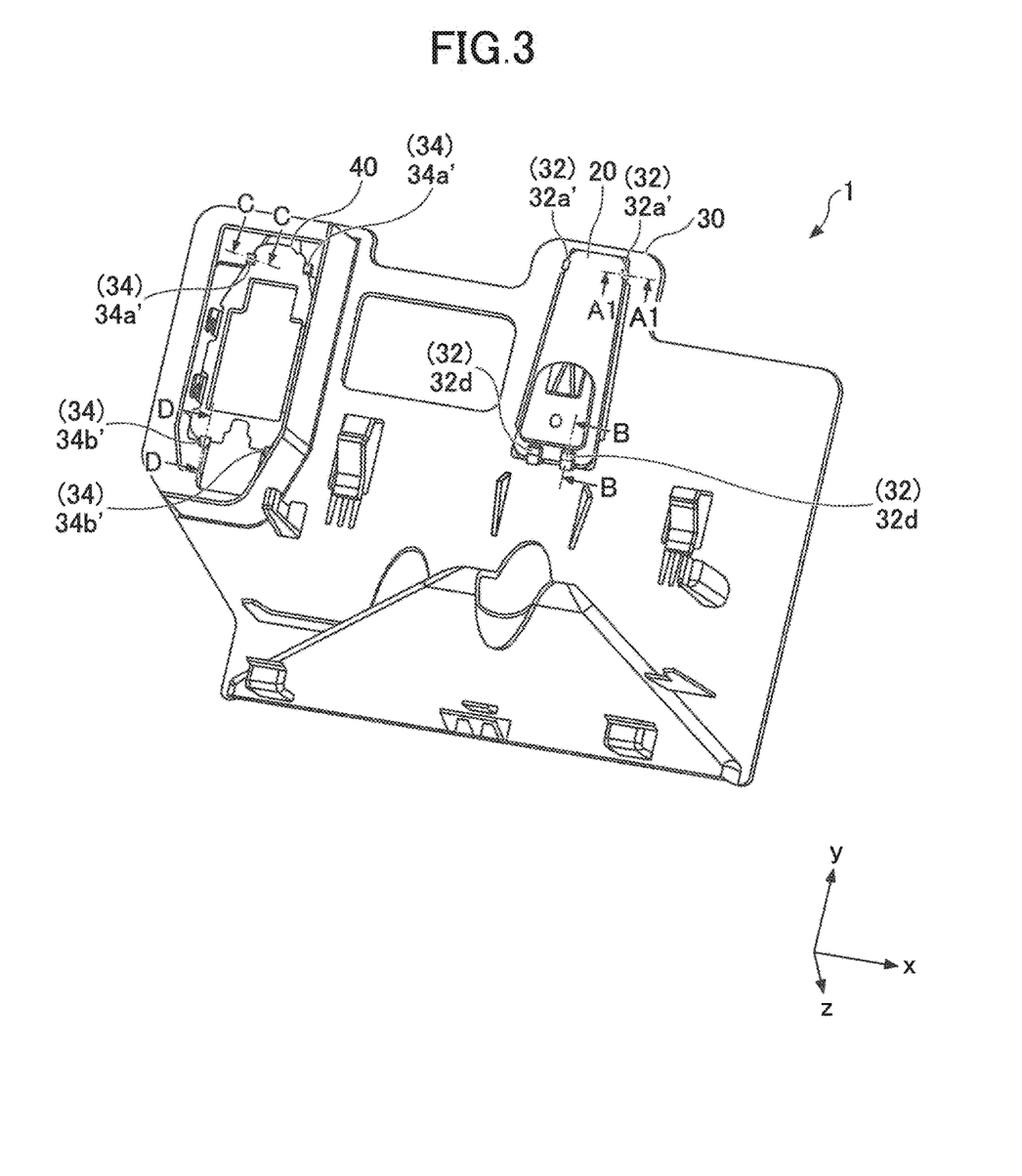
FIG. 3 is another perspective view of the mounting base according to the first embodiment seen from another direction.
Figure 4:
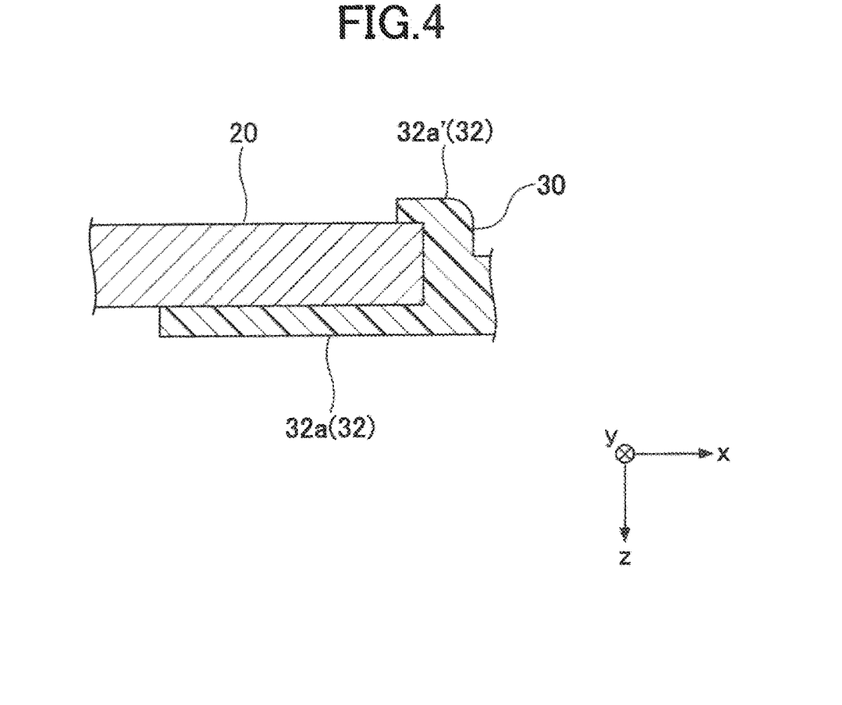
FIG. 4 is a cross-sectional view taken along the line A1-A1 in FIG. 3.
Figure 5:
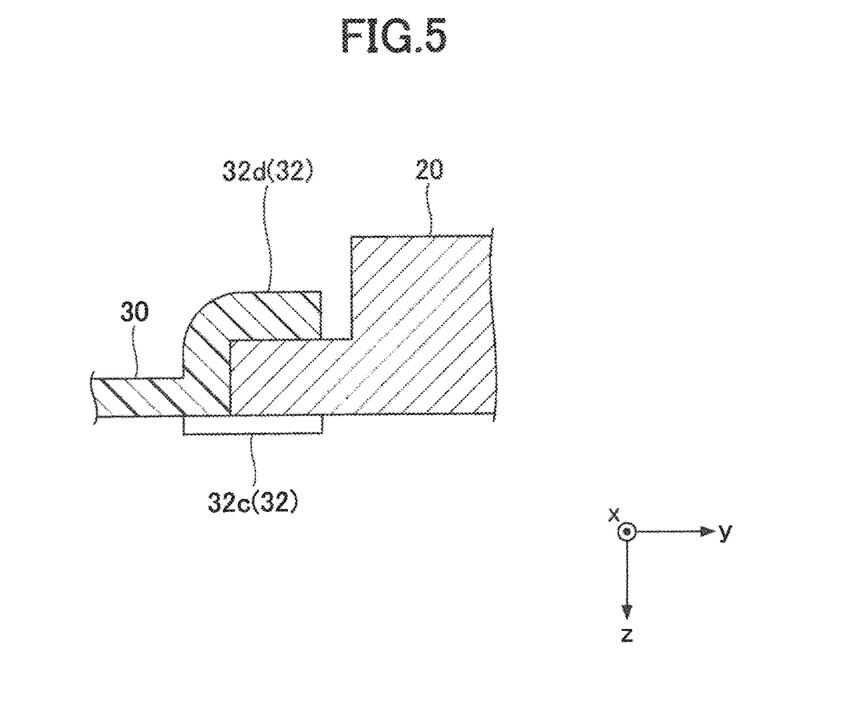
FIG. 5 is a cross-sectional view taken along the line B-B in FIG. 3.

FIG. 2 illustrates the mounting base 1 according to a first embodiment of the present invention in a view from the mounting surface side (the +z direction side), or from the side facing the mounting surface. FIG. 3 illustrates the mounting base 1 in a view from the inside of the vehicle (from the −z direction side) when attached to the glass G. FIG. 4 is a cross-sectional view taken along the line A1-A1 in FIG. 3, and FIG. 5 is a cross-sectional view taken along the line B-B in FIG. 3.

As illustrated in FIG. 2 and FIG. 3, the mounting base 1 according to the first embodiment of the present invention includes a mirror base 20 for mounting a rear-view mirror, and a component base 30 for mounting an in-vehicle component (also simply referred to as a component) other than the rear-view mirror.

The mirror base (also referred to as mirror button) 20 is a member to be a base on which a rear-view mirror is mounted. The mirror is usually supported by a supporting column, one end of which can be attached to the mirror base 20. The mirror base 20 is in an approximately plate-like shape, and as illustrated in FIG. 3, may have an uneven surface, or have one or more protrusions and/or depressions, for attaching the one end of the supporting column to the mirror base 20. Further, in the illustrated embodiment, the mirror base 20 is in an elongated shape in a planar view, which has a length in the y-axis direction greater than in the x-axis direction, but the shape is not limited to the illustrated shape. The mirror base 20 may have a shape having approximately the same lengths in the x-axis direction and in the y-axis direction.

The component base 30 is a member to be a base for mounting at least one in-vehicle component, specifically at least one in-vehicle component other than the rear-view mirror. As illustrated in FIG. 2 and FIG. 3, the component base 30 may be a member in an approximately plate-like shape like that of the mirror base 20 as described above. The component base 30 is, however, provided with a protrusion and/or a depression, specifically portions such as latches, holes, recesses or the like. Such portions allow to readily mount and lock the mounted in-vehicle component in such a manner that the mounted in-vehicle component can function properly in an appropriate position. The in-vehicle component to be installed in a vehicle by using the component base 30 is not particularly limited, but may preferably be an in-vehicle camera. Further, the number of the in-vehicle components installed directly by the component base 30 or of the in-vehicle components attached to the component base 30 may be one, or two or more.

As illustrated in FIG. 2, the mirror base 20 and the component base 30 are each at least partially exposed on the mounting surface side (the +z direction side) of the vehicle glass. That is, the mirror base 20 and the component base 30 each have an uncovered area on which an adhesive or the like may be directly applied. Therefore, when the mounting base 1 is mounted on the mounting surface (on the surface of the vehicle glass G, for example), the mirror base 20 and the component base 30 each can be adhesively bonded to the mounting surface in a predetermined area. Accordingly, the main load of the rear-view mirror can be received directly by the mirror base 20, while the main load of the in-vehicle component (s) other than the rear-view mirror can be received directly by the component base 30.

The size of the area of the mirror base 20 exposed on the side facing the mounting surface, that is, the size of the area in which the mirror base 20 can be adhesively bonded via the adhesive or the like, may be appropriately selected in accordance with rigidity, hardness, or the like of the material forming the mirror base 20, but is preferably approximately 2-5 cm². In a case that the entire surface of the mirror base 20 is exposed on the side facing the mounting surface, the size of the mirror base 20 in a planar view may preferably be approximately 2-5 cm². Further, the thickness of the mirror base 20 (the length in the z-axis direction) may also be appropriately selected in accordance with rigidity, hardness, or the like of the material forming the mirror base 20, but may preferably be approximately 4-16 mm so as to improve adhesion stability between the mirror base 20 and the mounting surface.

In the present embodiment, the mirror base 20 is fixed to the component base 30. In the illustrated embodiment, an opening 38 is formed approximately in the middle in the x-axis direction of the component base 30, adjacent to the end on the +y direction side. The mirror base 20 is arranged and fixed in the opening 38. The shape of the opening 38 in a planar view may correspond to the shape of the mirror base 20.

The rear-view mirror is relatively frequently adjusted or reoriented, and thus the mirror itself and the mirror base 20 are frequently subjected to external force. Further, as the mirror is usually placed in a position where an occupant can easily reach, especially in the upper area of the windshield, an occupant tends to consciously or unconsciously grab the mirror or the supporting column and lean his or her body weight on the mirror in getting on and off the vehicle, for example. Accordingly, a relatively large load can be applied on the mirror and the supporting column, and the mirror base 20. In case that the load is too large, the adhesion formed between the mirror base 20 and the mounting surface (the adhered surface or the bonding surface) could be broken resulting in delamination of the mirror base 20, or the mounting surface could be damaged. In contrast in the present embodiment wherein the mirror base 20 and the component base 30 are fixed to each other, a part of the load applied on the mirror base 20 can be transmitted to the component base 30. The transmission enables to reduce a load applied on the mirror base 20 and the mounting surface to which the mirror base 20 is adhesively bonded. Accordingly, the possibility of delamination of the mirror base 20 may be reduced. Further, even if the material of the member forming the mounting surface has a lower strength or the member has a smaller thickness, the damage to the member forming the mounting surface can be prevented.

A way of fixing the mirror base 20 to the component base 30 (a way of bonding the mirror base 20 and component base 30 to each other) is not particularly limited. The mirror base 20 may be fixed to the component base 30 by locking, fitting including press fitting, slide fitting, and the like, adhesion, etc. The mirror base 20 may be detachably or undetachably fixed to the component base 30. If the mirror base 20 is fixed by adhesion, an adhesive agent or an adhesive tape may be used. Further, the component base 30 may be molded so that the mirror base 20 is partially embedded in the component base 30, or the mirror base 20 is molded so that the component base 30 is partially embedded. The above described ways of fixing may be used in combination of two or more.

In the embodiment illustrated in FIG. 2 and FIG. 3, the mirror base 20 is fixed to the component base 30 by locking. Specifically, the component base 30 has an opening 38, in which the mirror base 20 is arranged and locked. As illustrated in FIG. 2 and FIG. 3, locking portions 32 (32a, 32a, 32a', 32a', 32c, 32d, 32d) are provided on the rim of the opening 38, and the rim of the mirror base 20 is fixed with the locking portions 32.

Specifically, the locking portions 32a, 32a are respectively provided both on rim sections extending approximately along the y-axis direction, relatively close to the end of the opening 38 on the +y direction side. The locking portions (latches) 32a, 32a on the upper side (the +z direction side) of the component base 30 respectively form a pair with small latches 32a', 32a' provided on the lower side (the −z direction side) of the component base 30. The mirror base 20 may be retained by the latches 32a, 32a positioned on the one side of the mirror base 20, and small latches 32a', 32a' positioned on the other side of the mirror base 20 so that the mirror base 20 is sandwiched between the latches 32a, 32a and the small latches 32a', 32a' in the upper-lower direction (see FIG. 4).

Further, on a rim section of the opening 38 extending approximately in the x-axis direction, on the end of the opening 38 in the −y direction, a latch 32c is provided on the upper side (the +z direction side) of the component base 30, and latches 32d, 32d (the −z direction side) are provided on the lower side of the component base 30. In the x-axis direction, the latch 32c is arranged between two latches 32d, 32d. The mirror base 20 is retained by the latches 32c, 32d, 32d so as to be sandwiched between the latch 32c and the latches 32d, 32d in the upper-lower direction (FIG. 5).

In the present embodiment, in order to attach the mirror base 20 to the component base 30, firstly, the end on the −y direction side of the mirror base 20 is inserted between the latch 32c and the latches 32d, 32d, from the lower side (the −z direction side), and pushed toward the rim section on the −y direction side of the opening 38 of the component base 30. Subsequently, the mirror base 20 is pressed into the opening 38 from the lower side toward the upper side (from the −z direction side to the +z direction side), and the side portions adjacent to the end on the +y direction side of the mirror base 20 are locked with the latches 32a, 32a and the small latches 32a', 32a'.

In the present embodiment, the mirror base 20 and the component base 30 are fixed to each other by locking, and the positional relation of the mirror base 20 and the component base 30 is secured. Therefore, when the mounting base 1 is attached to the mounting surface of the glass G or the like, it is not necessary to position each of the mirror base 20 and the component base 30. Respectively positioning the bases (positioning each base) to the mounting surface can possibly cause mispositioning or misalignment of the bases. However, such mispositioning or misalignment can be eliminated or minimized by the present embodiment. Accordingly, accuracy in positional relation of the in-vehicle component, i.e. the rear-view mirror, supported by the mirror base 20 and the other in-vehicle component supported by the component base 30 can be improved.

Further, the mirror base 20 and the component base 30 can be handled as one part in a mounting procedure, as the bases are tightly fixed to each other. Therefore, complexity in mounting can be reduced and a duration time for the mounting can be shortened.

In the illustrated embodiment, locking portions 32 (latches 32a, 32a, and 32c) formed on the upper side (the +z direction side) of the mounting base 1 are formed to be protruded from the surface of the upper side. That is, the locking portions 32 are protruded from the surface of the mirror base 20 and the component base 30 in the +z direction. The height of the portion of the locking portions 32 on the upper side (latches 32a, 32a, and 32c) is not limited as long as an adhesive applied between the mounting base 1 and the mounting surface maintains an adhesion function, but may be approximately 0.1-3.0 mm.

However, the locking portions 32 are not required to protrude in the +z direction. For example, the locking portions 32 may be formed so that the mirror base 20 and the component base 30 are flush on the upper side at least in the area that is to be adhesively bonded to the mounting surface. When the mirror base 20 and the component base 30 are flush on the upper side, the adhesive agent applied between the upper surface of the mounting base 1 and the mounting surface in the attaching process can be disposed in a uniform thickness. Accordingly, unevenness of stress distribution that could be caused in the layer of the adhesive under a load may be reduced.

Materials forming the mirror base 20 and the component base 30 are not particularly limited. The mirror base 20 and the component base 30 are preferably formed of materials different from each other. For example, the mirror base 20 may be formed of a material having a greater modulus of elasticity than a modulus of elasticity in the component base 30. More specifically, the mirror base 20 may be formed of a material having a greater modulus of longitudinal elasticity than that in the component base 30. Further, the mirror base 20 may be formed of a material having a greater hardness than a hardness in the component base 30. By forming the mirror base 20 of a material having a relatively greater flexural modulus of elasticity or a relatively greater hardness as described above, the rear-view mirror and the supporting column, on which a large load is likely applied, can be stably fixed to the mounting surface.

The component base 30 is used for mounting one or more in-vehicle components other than the mirror, and may be formed so as to entirely or partially surround the mirror base 20 in a planar view. The component base 30 may be a main member (main base) in the mounting base 1, and have approximately the same contour as the mounting base 1. The component base 30 has thus a relatively large area, at least an area larger than the area of the mirror base 20. The mounting surface on which the mounting base 1 is attached, such as the surface of the vehicle glass plate may often be curved. In such a case of the curved glass, if the component base 30 is made of a material having a too high flexural modulus of elasticity or a too high hardness, a gap could be created between the component base 30 and the mounting surface and the component base 30 cannot adhere tightly to the mounting surface, resulting in a decrease in the adhesion strength. In contrast, when the material forming the component base 30 may have a relatively low flexural modulus of elasticity or a relatively low hardness, the component base 30 is flexible so as to be curved following the curve of the mounting surface. Accordingly, the mounting base 1 can tightly adhere to the mounting surface.

The modulus of longitudinal elasticity (Young's modulus) of the mirror base 20 is preferably 3 GPa or more, more preferably 30 GPa or more. The mirror base 20 having a modulus of longitudinal elasticity in the above-mentioned range may ensure a more stable fixation of the mirror and the supporting column to the glass surface. The flexural modulus of elasticity of the component base 30 is preferably 300 MPa or less, more preferably 150 MPa or less, in a case that a resin material is selected as a material for the component base 30. The component base 30 having a modulus of longitudinal elasticity in the above-mentioned range improves an ability to follow a curve of the glass surface (the mounting surface). However, the component base 30 may be formed of a material having a modulus of longitudinal elasticity or a flexural modulus of elasticity equivalent to the material of the mirror base 20, depending on the size of the component base 30, the type of a device to be mounted, etc., or in a case of a smaller curvature of the mounting surface of the glass. The above-mentioned modulus of longitudinal elasticity and flexural modulus of elasticity can be measured based on ASTM D790 or the like.

The hardness of the mirror base 20 is preferably 5.0 HRC or more, more preferably 20 HRC or more on the Rockwell hardness scale. The above-mentioned hardness can be measured based on JIS Z2245.

The material forming the mirror base 20 is not particularly limited as long as the material has a modulus of longitudinal elasticity or a hardness that permits a stable fixation of the mirror and the supporting column to the mounting surface. The mirror base 20 may be formed of a material preferably including metal or resin. Examples of the material for the metal mirror base 20 may include zinc, and aluminum, and an alloy thereof, stainless steel (SUS) including sintered stainless steel, and the like. The above-mentioned materials may be used singly or in combination.

The mirror base 20 may be formed of resin. Examples of the resin for the mirror base 20 include polyesters such as polyethylene terephthalate (PET), and polybutylene terephthalate (PBT); polyolefins such as polyethylene (PE), and polypropylene (PP); polyamides (PA) such as polycarbonates (PC), nylon 6, and nylon 6, 6, highly heat-resistant polyamides (PA6T/PA6I); polyimides (PI); polyether imides (PEI); acrylonitrile-butadiene-styrenes (ABS); polyacetals (POM); polyvinyl chlorides (PVC); and the like.

When the mirror base 20 is made of resin, the resin may be reinforced with filler such as fibers, inorganic particles, or a combination thereof. The types of the reinforcing fibers used include preferably glass fibers, carbon fibers, and the like. The fiber-reinforced resin used is preferably a polyetherimide or a highly heat-resistant polyamide reinforced with glass fibers. In a case that the resin contains the reinforcing fibers, the fibers may be contained in an amount of 5-70% by mass, preferably 30-50% by mass with respect to the total amount of the resin.

In a case that the mirror base 20 is made of metal, the mirror base 20 may be formed by a die-casting method, a casting method, or the like. A resin mirror base 20 may also be formed by injection-molding or the like.

The material forming the component base 30 is also not particularly limited. The component base 30 may preferably be formed of a material capable of bending following the curve of the mounting surface. For example, the component base 30 may be formed of a material including a resin. Examples of the resin forming the component base 30 include polyesters such as polyethylene terephthalate (PET), and polybutylene terephthalate (PBT); polyolefins such as polyethylene (PE), and polypropylene (PP); polyamides (PA) such as polycarbonates (PC), nylon 6, and nylon 6, 6, highly heat-resistant polyamides (PA6T/PA6I); polyimides (PI); polyether imides (PEI); acrylonitrile-butadiene-styrenes (ABS); polyacetals (POM); polyvinyl chlorides (PVC); and the like.

The resin forming the component base 30 may also be reinforced with filler such as fibers, inorganic particles, or the like. The types of the reinforcing fibers used include preferably glass fibers, carbon fibers, and the like. In a case that the resin contains the reinforcing fibers, the fibers may be contained in an amount of 50% by mass or less, preferably 30% by mass or less with respect to the total amount of the resin.

In a case that the component base 30 is made of resin, the component base 30 may be formed by injection molding or the like.

In a case that the mirror base 20 is fixed to the component base 30 by locking as illustrated in FIG. 2 and FIG. 3, the mirror base 20 and the component base 30 may be at least partially spaced apart to form a gap.

The mirror base 20 and the component base 30 may be fixed to each other via another member. However, the mirror base 20 and the component base 30 are preferably at least partially in contact with each other, as such a configuration may improve accuracy in fixing the bases in predetermined positions.

Further, the mounting base 1 may include an additional base 40 for mounting an additional in-vehicle component other than the rear-view mirror and the component mounted via the component base (main base) 30 (see FIG. 2 and FIG. 3). The in-vehicle component which can be mounted by using the additional base 40 may be a sensor, for example.

In the same manner as in the mirror base 20, the additional base 40 may preferably be formed of a material different from the material forming the component base (main base) 30. The additional base 40 may be fixed to the component base 30. This configuration eliminates a need for respectively positioning the additional base 40 and the component base 30, and prevents a misalignment between the additional base 40 and the component base 30. Accordingly, accuracy in positioning the in-vehicle component (in-vehicle camera, for example) supported by the component base 30 and the other in-vehicle component (sensor, for example) supported by the additional base 40 relative to each other, can be improved.

A way of fixing the additional base 40 to the component base 30 is not particularly limited. The additional base 40 may be detachably or undetachably fixed to the component base 30. For example, as illustrated in FIG. 2 and FIG. 3, the component base 30 may be provided with locking portions 34 (34*a*, 34*a*, 34*a'*, 34*a'*, 34*b*, 34*b*, 34*b'*, 34*b'*) arranged so as to correspond to the contour shape of the additional base 40. These locking portions 34 enable a fixation and retention of the additional base 40. Specifically, the component base 30 has an opening in which the additional base 40 may be disposed and fixed. The locking portions 34 may be formed on the rim of the opening in the component base 30.

Figure 6:
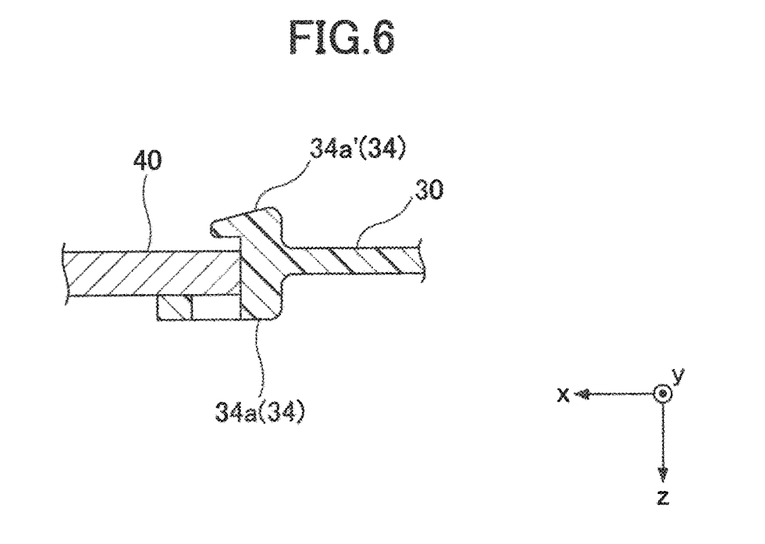
FIG. 6 is a cross-sectional view taken along the line C-C in FIG. 3.
Figure 7:
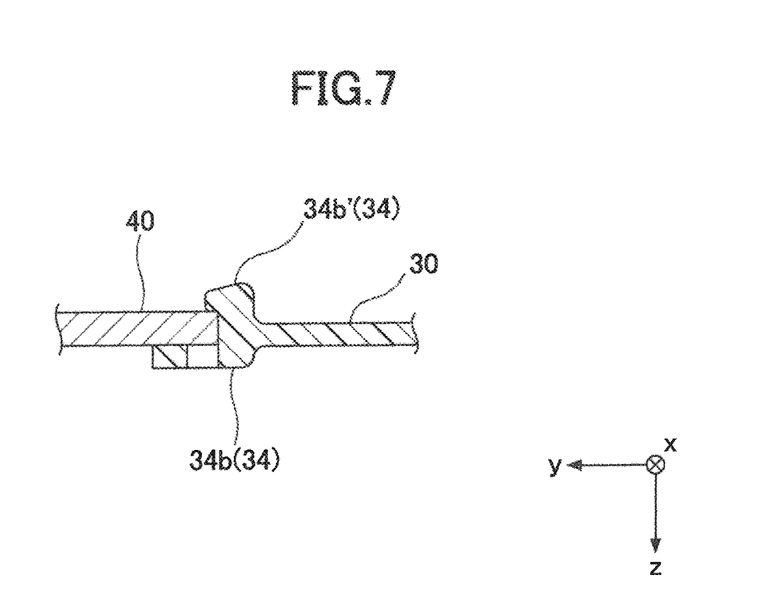
FIG. 7 is a cross-sectional view taken along the line D-D in FIG. 3.

FIG. 6 and FIG. 7 are cross-sectional views of apart of the structure including the additional base 40. FIG. 6 is a cross-sectional view taken along the line C-C in FIG. 3, and FIG. 7 is a cross-sectional view taken along the line D-D in FIG. 3. Hereinafter, the fixation of the additional base 40 will be specifically described.

The component base 30 includes locking portions 34*a*, 34*a* on the upper surface side (the +z direction side) in positions relatively close to the end on the +y direction side. These locking portions 34*a*, 34*a* are respectively paired with locking portions 34*a'*, 34*a'* (see FIG. 3) provided on the lower surface side (the −z direction side). The additional base 40 is retained by the locking portions 34*a*, 34*a*, 34*a'*, 34*a'* so that the rim of the additional base 40 at ends in the x-axis direction are respectively sandwiched between the locking portions 34*a*, 34*a* on the upper surface side and the locking portions 34*a'*, 34*a'* on the lower surface side (see FIG. 6).

Further, the component base 30 includes locking portions 34*b*, 34*b* on the upper surface side (the +z direction side) in positions relatively close to the end on the −y direction side. These locking portions 34*b*, 34*b* are respectively paired with locking portion 34*b'*, 34*b'* (see FIG. 3) disposed on the lower surface side (the −z direction side). The additional base 40 can be retained by these locking portions 34*b*, 34*b*, 34*b'*, 34*b'* so that corners of the additional base 40 at the end on the −y direction side are sandwiched in the upper-lower direction between the locking portions 34*b*, 34*b* on the upper surface side and the locking portions 34*b'*, 34*b'* on the lower surface side (FIG. 7).

When the additional base 40 is attached to the component base 30, the additional base 40 is firstly inserted from the lower surface side (the −z direction side) so that two corners of the additional base 40 are each disposed between a pair of the locking portion 34*b* and the locking portion 34*b'* formed relatively close to the end on the −y direction side. Then, the additional base 40 may be pressed toward the +z direction, and fixed to and retained in the component base 30 by the locking portions 34*a*, 34*a*, 34*a'*, 34*a'*.

The additional base 40 is preferably formed of a material different from a material forming the component base 30, and for example, may be made of metal. The metal used for the additional base 40 may be, for example, stainless steel, aluminum, Steel Plate Cold Commercial steel (SPCC steel; ordinary steel defined in JIS G 3141). The modulus of longitudinal elasticity of the additional base 40 is preferably 80 GPa or more, more preferably 120 GPa or more.

In the same manner as in the mirror base 20, the additional base 40 may be at least partially disposed on the mounting surface side, so as to directly adhere to the mounting surface in a predetermined area size. In that case, the additional base 40 can directly receive the load of the in-vehicle component mounted thereon.

Figure 8:
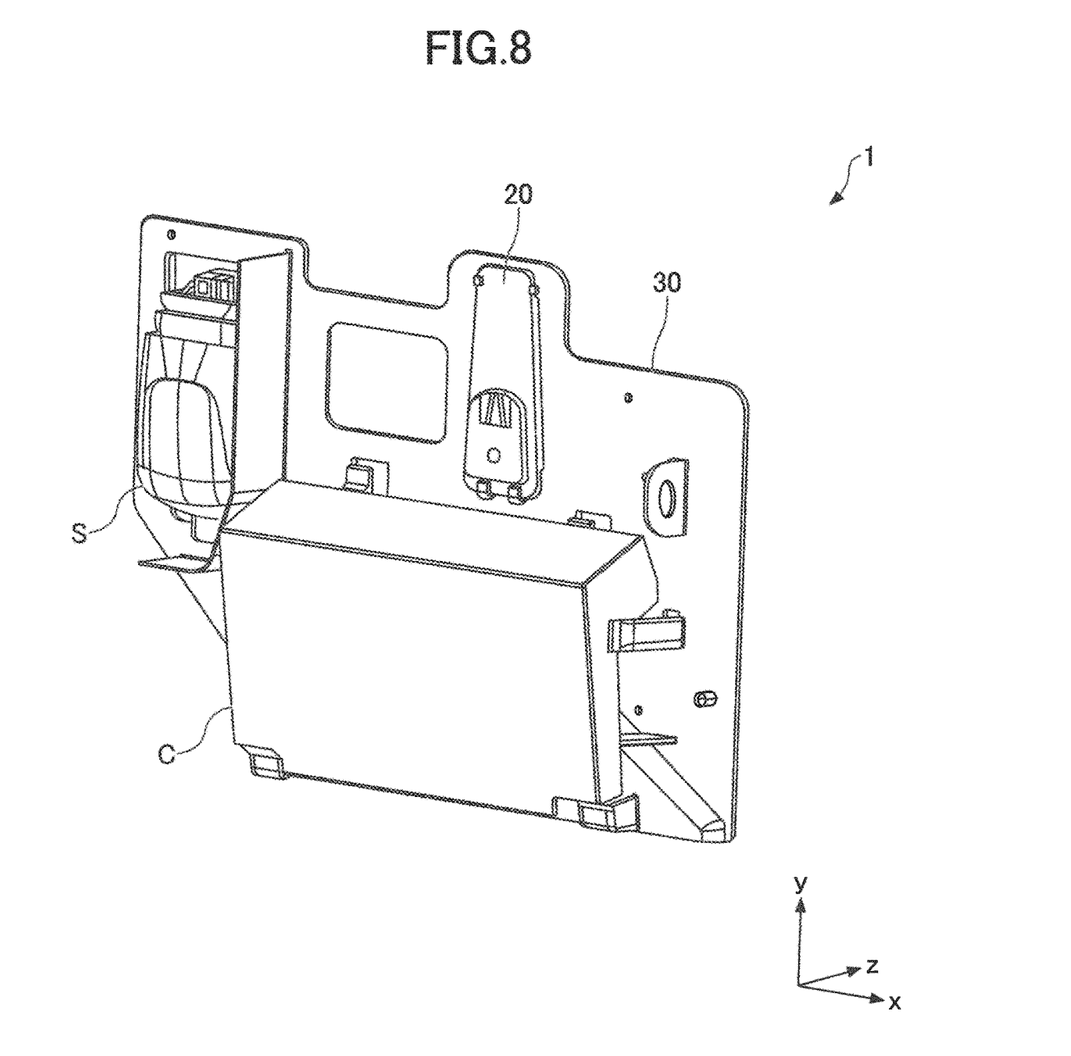
FIG. 8 is a view of an example of a mounting base on which some in-vehicle components are mounted.

FIG. 8 is a view of the mounting base 1 according to the present embodiment, on which in-vehicle components are mounted. In the example illustrated in FIG. 8, a camera unit C (including a camera, accessories, a cover, etc.) is mounted on the component base 30 of the mounting base 1, and a sensor unit S (including a sensor, accessories, a cover, etc.) is mounted on the additional base 40. In this manner, the in-vehicle components can be mounted on the −z direction side of the mounting base 1.

Figure 9:
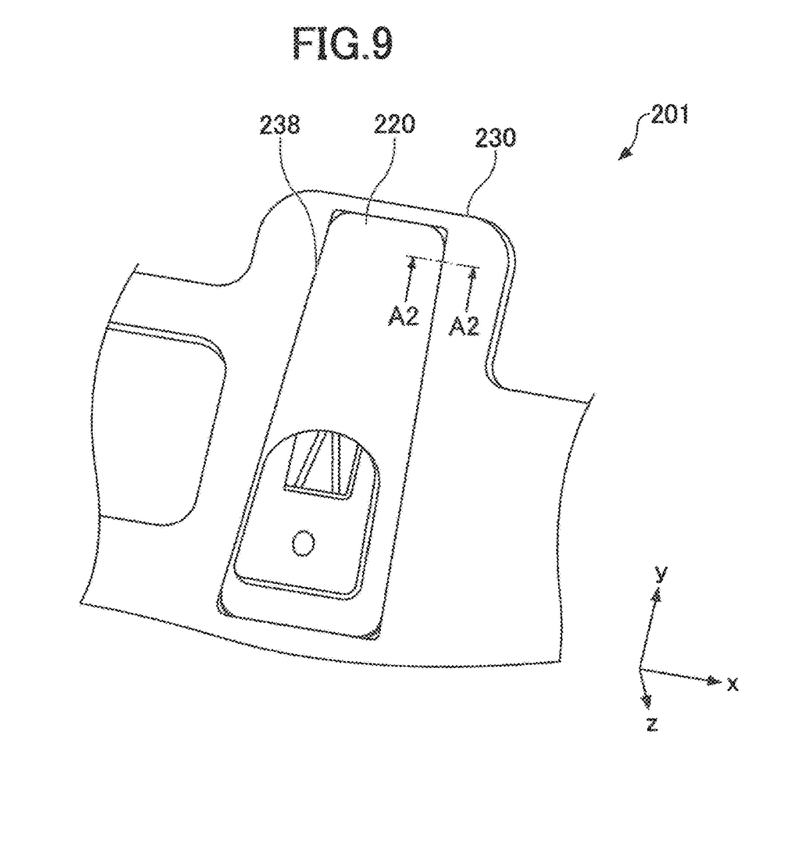
FIG. 9 is an enlarged view of a part of a mounting base according to a second embodiment.
Figure 10:
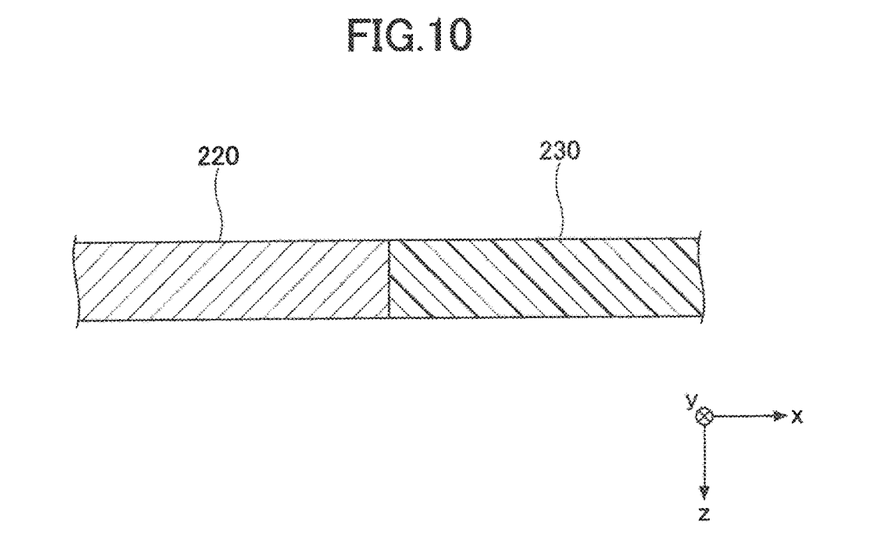
FIG. 10 is a cross-sectional view taken along the line A2-A2 in FIG. 9.

FIG. 9 is a partially enlarged view of a mounting base 201 according to a second embodiment of the present invention. FIG. 10 is a cross-sectional view taken along the line A2-A2 in FIG. 9. In the same manner as in the first embodiment, the mounting base 201 is configured to be attached to a mounting surface inside of a vehicle. The mounting base 201 includes a mirror base 220 and a component base 230, wherein the mirror base 220 is fixed to the component base 230. The second embodiment is different from the first embodiment in that the mirror base 220 is fixed to the component base 230 in a different manner.

As illustrated in FIG. 9, in the second embodiment, locking portions are not provided on the rim of the opening 238 in the component base 230, but the mirror base 220 is fitted in the opening 238 of the component base 230. For example, the size (at least part of the length in the x-axis direction and the length in the y-axis direction) of the opening 238 of the component base 230 may be slightly smaller than the size of the mirror base 220, so that the mirror base 220 and the component base 230 are fitted by pressing the mirror base 220 in the opening 238 of the component base 230. Further, in a case that the component base 230 is formed of a thermoplastic material, the mirror base 220 is softened by heating and then fitted in the opening 238 of the component base 230.

As illustrated in FIG. 10, the boundary between the mirror base 220 and the component base 230 is parallel to the z-axis direction, but the direction of the boundary is not limited to the illustrated example. The boundary may be inclined with respect to the z-axis direction. For example, in a cross section along the z-axis direction, the width (the length of the x-axis direction) and/or the length (the length of the y-axis direction) of the mirror base 220 may be increased toward the −z direction. The opening 238 of the component base 230 may be formed so as to have a shape corresponding to the shape of the mirror base 220.

In the second embodiment, the rim (specifically portions at and adjacent to corners may not be included) of the opening 238 in the component base 230 is entirely or partially tightly contacted with the mirror base 220. Further, in the present embodiment, a mounting base 201 with simple configuration may be provided, as formation of locking portions is not necessary.

Further, according to the present embodiment, on the glass-facing surface of the mounting base 201, the component base 230 and the mirror base 220 may be flush.

Figure 11:
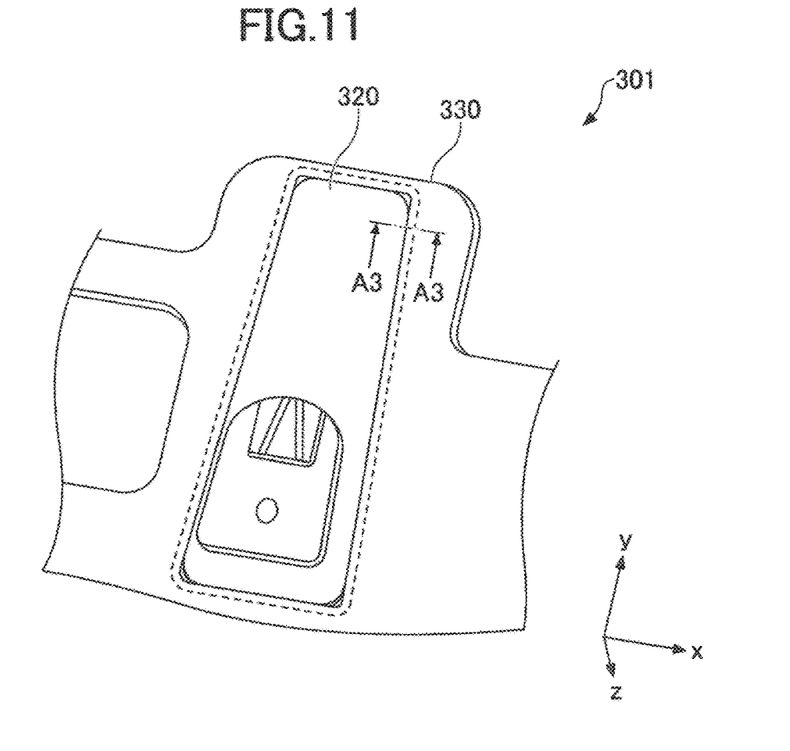
FIG. 11 is an enlarged view of a part of a mounting base according to a third embodiment.
Figure 12:
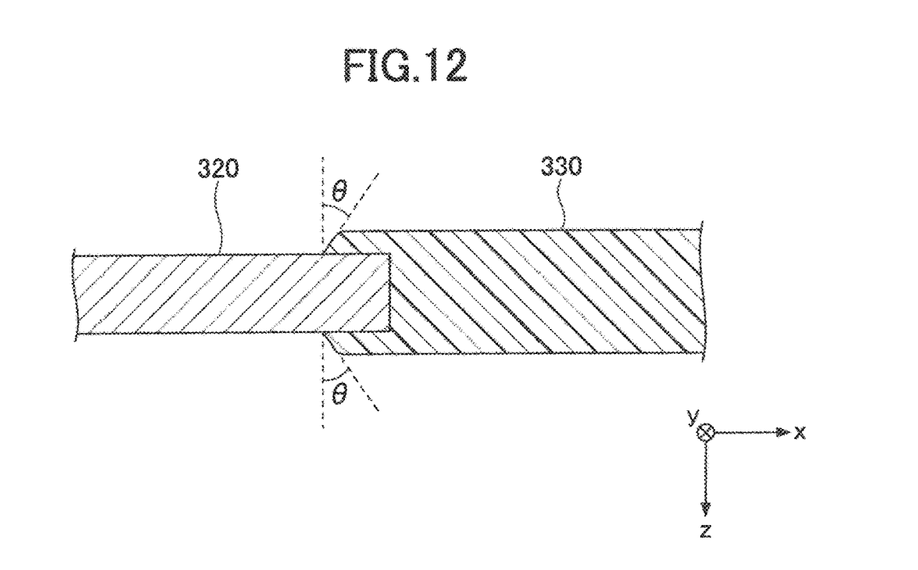
FIG. 12 is a cross-sectional view taken along the line A3-A3 in FIG. 11.

FIG. 11 is a partially enlarged view of a mounting base 301 according to a third embodiment of the present invention. FIG. 12 is a cross-sectional view taken along the line A3-A3 in FIG. 11. In the same manner as in the first embodiment and the second embodiment, the mounting base 301 is configured to be attached to a mounting surface inside of the vehicle. The mounting base 301 includes a mirror base 320 and a component base 330, wherein the mirror base 320 is fixed to the component base 330. The third embodiment is different from the first embodiment and the second embodiment in that the mirror base 320 is fixed to the component base 330 in a different manner.

In the third embodiment, the component base 330 is formed by injection molding. A material forming the component base 330 may tightly hold and sandwich the peripheral rim of the mirror base 320 in the upper-lower direction (FIG. 12). As illustrated in FIG. 12, the inner rim of the component base 330, which holds the peripheral rim of the mirror base 320 as described above, has preferably an inclined contour with respect to the z-axis direction at an angle θ in the cross-sectional view (FIG. 12). The angle θ is preferably 0° or more and 10° or less, more preferably 0° or more and 8° or less.

In the illustrated example, the component base 330 is injection-molded so that the mirror base 320 is sandwiched not only in the z-axis direction but also in the y-axis direction. The mirror base 320 is also sandwiched in the z-axis direction and the x-axis direction. However, the mirror base 320 may not necessarily be sandwiched in the z-axis direction. For example, the component base 330 may be injection-molded so that the molding material of the component base 330 is not disposed on either of the upper side or the lower side of the mirror base 320, and both ends in the y-direction of the mirror base 320 are abutted and pressed by a molding material of the component base 330 sandwiching the mirror base 320 in the y-axis direction.

In the illustrated example, the entire peripheral rim of the mirror base 320 is sandwiched and retained by the component base 330. However, as long as the mirror base 320 can be fixed to the component base 330, the peripheral rim of the mirror base 320 may be partially sandwiched by the component base 330. For example, the component base 330 may be injection-molded so that only the rim sections extending in the approximate y-axis direction of the mirror base 320 are respectively entirely or partially sandwiched.

On the rim of the mirror base 320, one or more protrusions protruding outwardly from the end surface along the plane (approximately in a direction parallel to the x-y plane) may be formed. The component base 330 may be injection-molded so that the protrusions may be inserted in the molding material of the component base 330.

According to the present embodiment, the component base 330 and the mirror base 320 may be rigidly connected. Therefore, even in a case that the mounting base 301 may be physically impacted in the process of attaching the mounting base 301 to the surface of the vehicle glass, detaching the mirror base 320 and the component base 330 from each other can be prevented.

Figure 13:
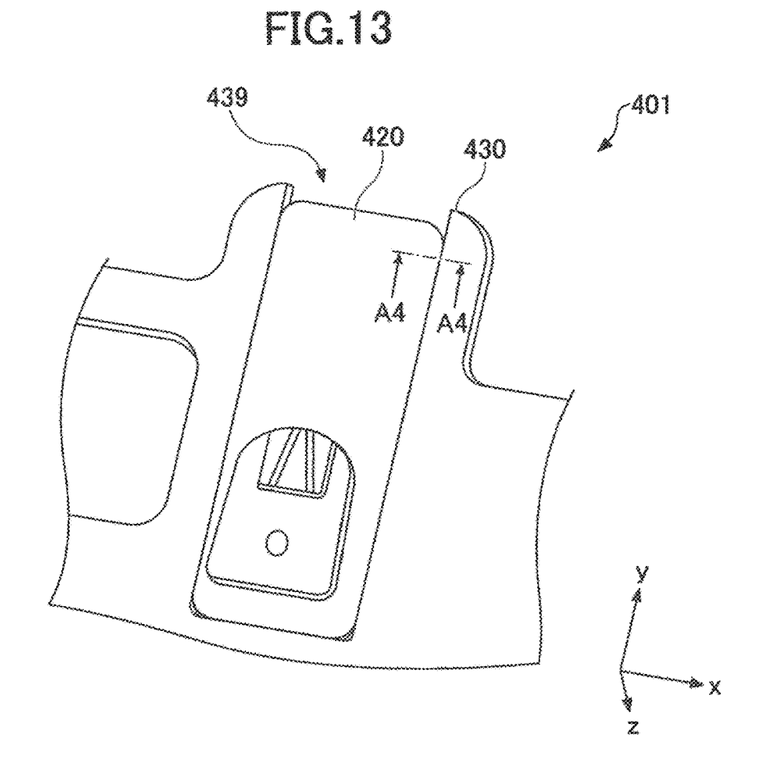
FIG. 13 is an enlarged view of a part of a mounting base according to a fourth embodiment.
Figure 14:
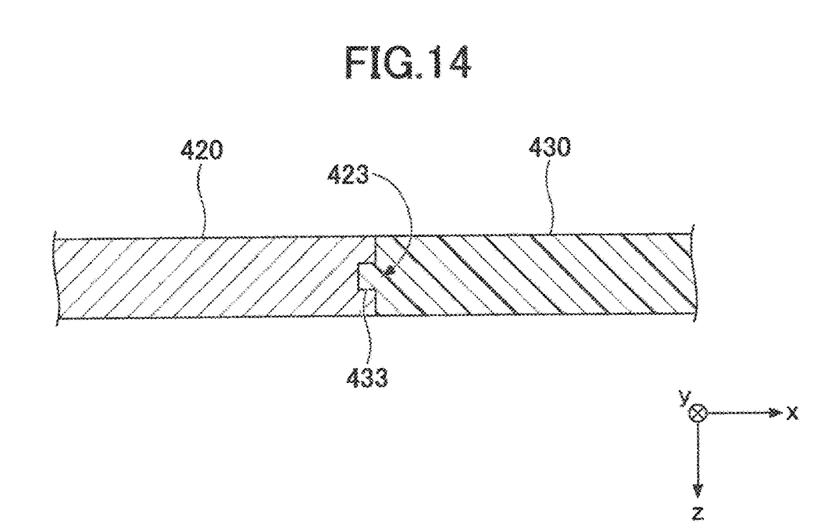
FIG. 14 is a cross-sectional view taken along the line A4-A4 in FIG. 13.

FIG. 13 is a partially enlarged view of a mounting base 401 according to a fourth embodiment of the present invention. FIG. 14 is a cross-sectional view taken along the line A4-A4 in FIG. 13. In the same manner as in the first embodiment to the third embodiment, the mounting base 401 is configured to be attached to the mounting surface inside of a vehicle. The mounting base 401 includes a mirror base 420 and a component base 430, wherein the mirror base 420 is fixed to the component base 430. The fourth embodiment is different from the first embodiment to the third embodiment in that the mirror base 420 is fixed to the component base 430 in a different manner.

In the fourth embodiment, a groove extending approximately along the y-axis direction is formed on each end surface on rim sections of the mirror base 420 extending approximately along the y-axis direction (each end surface extending approximately along the z-axis direction). On the other hand, on each end surface of the component base 430 facing the mirror base 420, a projecting portion 433 extending approximately along the y-axis direction is formed corresponding to each groove formed on the end surface of the mirror base 420 (see FIG. 14). The projecting portions 433 are formed so as to be able to slide respectively in the corresponding grooves 423 of the mirror base 420.

Unlike in the above-described first embodiment to third embodiment, the component base 430 in the fourth embodiment has a recess 439 opening toward the +y direction, as illustrated in FIG. 13. In attaching the mirror base 420 to the component base 430, the mirror base 420 is slidably fitted to the component base 340. That is, the mirror base 420 can be slid along the projection portions 433 of the component base 430 in the y-axis direction until the end on the −y direction side of the mirror base 420 abuts to the end surface of the recess 439 in the component base 430.

In the illustrated example, the groove 423 formed on the mirror base 420 and the projecting portion 433 formed on the component base 430 correspond to each other. However, in an opposite manner, a projecting portion may be formed on the mirror base 420 and a groove corresponding to the groove may be formed on the component base 430, so that the projecting portion of the mirror base 420 may be slidably moved in the groove of the component base 430. In that case, the mirror base 420 can be fixed to the component base 430 by inserting the mirror base 420 into a recess 437 of the component base 430.

The mounting bases according to the above embodiments may be attached to a mounting surface inside of a vehicle. As mentioned above, the mounting surface inside of a vehicle may be a glass or a glass plate for using in a vehicle. An embodiment of the present invention may be a glass for a vehicle, on which a mounting base is attached, or a vehicle glass with a mounting base 100 (FIG. 1). Examples of the glass for a vehicle, or a vehicle glass, include a front window glass (windshield), a rear window glass, and a side window glass, and may particularly be a windshield.

The glass for a vehicle may be a glass plate formed of glass such as soda lime silicate glass, aluminosilicate glass, borate glass, lithium aluminosilicate glass, and borosilicate glass. The glass plate may not be necessarily reinforced, but may be reinforced by air-cooling or a chemical treatment. The non-reinforced glass is made by forming molten glass in a plate-shape followed by gradually cooling. In the case of an air-cooling-reinforced glass, the glass may be reinforced by homogeneously heating a glass plate to the temperature close to the softening point, and rapidly cooling to cause a compression stress in the glass surface due to a temperature difference between the surfaces and the inside of the glass. In a case of the chemically reinforced glass, the glass may be reinforced by causing a compressive stress on the glass surface by an ion exchange method or the like. Further, as the vehicle glass, a glass plate absorbing ultraviolet ray or infrared ray may be used. In addition, the vehicle glass is preferably transparent. In that case, the glass may be colored in the extent that the transparency is not impaired. For the vehicle glass, an organic glass may also be used. Examples of the organic glass include transparent resins such as polycarbonate and the like. The shape of the glass is not particularly limited to a rectangular shape, and the glass used in the embodiments may be processed in any shape in a planar view and/or in any curvature. The glass plate for the vehicle glass in the embodiments may be formed by bending, specifically by gravity forming, press forming, or the like. The forming method of the glass plate is not particularly limited, but a glass plate formed by a float method or the like may be preferably used.

The vehicle glass may be a laminated glass, which includes a plurality of the above-mentioned glass plates. The laminated glass includes an intermediate film between the glass plates. Examples of the intermediate film include ethylene-vinyl acetal, polyvinyl butyral, and the like.

The total thickness of the glass plate forming the vehicle glass is approximately 4.0-6.0 mm. In a case of a laminated glass, the thickness of the glass plate is approximately 1.5-2.4 mm. The thickness of the glass plate on the vehicle interior side and the thickness of the glass plate on the vehicle exterior side may be the same, or may be different. In view of the weight lightening of the vehicle, the thickness of the glass plate on the vehicle interior side may be 0.5-1.6 mm.

In a case that a glass plate on the vehicle interior side is relatively thin as described above, the mounting surface to which the mounting base 1 is attached can be a surface of a glass plate having a relatively smaller thickness, having a relatively smaller strength. In such a case, the glass plate could be damaged or broken, if too great a load were to be applied to the mirror. In the present embodiment, however, the mirror base and the component base are fixed to each other, and at least part of load applied on the mirror base can be transmitted to the component base so as to distribute the load. Therefore, even if a large load is applied on the mirror, a possibility of damaging the glass plate or the vehicle glass may be reduced.

Further, as described above, the mounting base according to the present embodiment may be configured to be able to follow the curve of the surface. The radius R of curvature of the surface of the vehicle glass, at least in the area on which the mounting base is attached, may be 3000 or more and 5000 or less. The surface of the area on which the mounting base is attached may also be planar. In the above, the unit for the radius R of curvature is mm.

In view of securing the view of an occupant, the mounting base 1 is preferably attached in the middle on the upper region in the vehicle glass, as illustrated in FIG. 1. In a case that the mounting base 1 is attached to a windshield, the width of the mounting base 1 (the length in the x-axis direction) may preferably be approximately 6-30 cm, and the length (the length in the y-axis direction) may preferably be approximately 10-18 cm.

In manufacturing a glass for a vehicle with amounting base, a mounting base may be adhered to the vehicle glass by using an adhesive agent and/or an adhesive tape. The adhesive agent and/or an adhesive tape may be applied to both of the mirror base and the component base, in the area exposed to a mounting surface of the vehicle glass. In a case that the mirror base and the component base are formed of different materials from each other, for example, that the mirror base is made of metal while the component base is made of resin, an adhesive agent and/or an adhesive tape appropriate for each material may be used. When using an adhesive agent and/or an adhesive tape appropriate for both of metal and resin, the exposed areas in the mirror base and the component base can be adhesively bonded to the mounting surface with one type of adhesive agent and/or adhesive tape. Such a double purpose adhesive agent and/or adhesive tape simplifies a process of attaching the mounting base to the mounting surface.

In a case that a resin base is adhesively bonded to the mounting surface, an adhesive agent for resin, such as polyurethane adhesive agent or the like may be used. In a case that a metal base is adhered, an adhesive agent for metal, such as polyurethane adhesive, silicone adhesive, acrylic resin adhesive, or the like may be used.

Further, for adhesively bonding the mounting base, an adhesive agent for resin and metal, such as an adhesive agent containing modified silicone and epoxy resin, such as "MOS (registered trademark) 200" from Konishi Co. Ltd. may be used, and urethane elastic adhesive, hot-melt adhesive, or the like may also be used. When the adhesive agent for resin and metal, or the dual-purpose adhesive agent is used to bond the mounting base according to the present embodiment to a vehicle glass, the adhesive agent used in an adhesive bonding process can be of one type. Therefore, the dual-purpose adhesive agent can simplify the manufacturing process of a glass for a vehicle with a mounting base. Further, when the dual-purpose adhesive agent for resin and metal is used, the adhesive agent may be continuously applied to the glass facing surface of the mounting base, specifically also on the boundary between members included in the mounting base, for example, the boundary between the mirror base and the component base and an area close to the boundary. Accordingly, the application process may be more readily performed.

When the mounting base is adhesively bonded to the vehicle glass, an appropriate primer may be applied to each member included in the mounting base and/or the glass surface before applying an adhesive agent, as necessary.

What is claimed is:

1. A mounting base for mounting in-vehicle components on an interior side of a vehicle glass, comprising:
    a mirror base for mounting a rear-view mirror and comprising a mirror base exposed area; and
    a component base for mounting the in-vehicle component other than the rear-view mirror and comprising a component base exposed area,
    wherein the mirror base exposed area of the mirror base and the component base exposed area of the component base are each at least partially exposed along a vehicle glass-facing side of the mounting base, wherein the vehicle glass-facing side of the mounting base is configured to face a mounting surface side of the vehicle glass when the mounting base is attached to the vehicle glass, wherein an adhesive agent and/or an adhesive tape for adhesive bonding to the vehicle glass is applied to the mirror base exposed area and the component base exposed area, wherein the mirror base exposed area and the component base exposed area are configured to face the mounting surface side of the vehicle glass when the mirror base and the component base are attached to the vehicle glass, and wherein the mirror base is fixed to the component base, and formed of a material having a modulus of longitudinal elasticity greater than a modulus of longitudinal elasticity of the component base.

2. The mounting base according to claim 1, wherein the mirror base is fixed to the component base by one of locking, fitting or adhesive bonding.

3. The mounting base according to claim 1, wherein the modulus of longitudinal elasticity of the mirror base measured based on ASTM D790 is 3 GPa or more, and wherein a flexural modulus of elasticity of the component base measured based on ASTM D790 is 300 MPa or less.

4. The mounting base according to claim 1, wherein the mirror base includes a metal, and the component base includes a resin.

5. The mounting base according to claim 1, wherein, the mounting base is to be shielded with a shield layer disposed on the vehicle glass as seen from a vehicle exterior side.

6. The mounting base according to claim 1, wherein the vehicle glass is a laminated glass.

7. A vehicle glass assembly comprising:
the vehicle glass with the mounting surface side; and
the mounting base according to claim 1, wherein the mounting base is attached on the mounting surface side of the vehicle glass.

8. The mounting base according to claim 1, wherein the component base is at least partially injection-molded with the mirror base.

9. The mounting base according to claim 1, wherein the mirror base exposed area and the component base exposed area are each configured to be adhered to the mounting surface side of the vehicle glass.

10. The mounting base according to claim 1, wherein the mirror base is configured to be at least partially exposed along the vehicle glass-facing side of the mounting base through a portion of the component base.

11. The mounting base according to claim 1, wherein the mirror base and the component base are flush on an upper side of the mounting base at least in an area that is configured to be adhesively bonded to the mounting surface side of the vehicle glass.

12. The mounting base according to claim 1, wherein the mirror base and the component base are formed of different materials from each other, and the adhesive agent and/or the adhesive tape is configured to adhere to both of the mirror base and the component base.

13. The mounting base according to claim 1, wherein the mirror base and the component base are formed of different materials from each other, and the mirror base and the component base are adhesively bonded to the vehicle glass by using one type of the adhesive agent and/or one type of the adhesive tape that is configured to adhere to both of the mirror base and the component base.

* * * * *